United States Patent
Takahashi et al.

(10) Patent No.: US 6,361,216 B1
(45) Date of Patent: Mar. 26, 2002

(54) DYNAMIC PRESSURE BEARING

(75) Inventors: Takeshi Takahashi, Kashiba; Yasuo Takamura, Yamatokoriyama, both of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/609,417

(22) Filed: Jul. 5, 2000

(30) Foreign Application Priority Data

Jul. 5, 1999 (JP) .......................................... 11-190323

(51) Int. Cl.$^7$ ............................................. F16C 32/06
(52) U.S. Cl. ........................ 384/123; 384/107; 384/112
(58) Field of Search ............................ 384/107, 111, 384/112, 113, 121, 123

(56) References Cited

U.S. PATENT DOCUMENTS

| | | | | |
|---|---|---|---|---|
| 5,433,529 A | * | 7/1995 | Hensel | 384/112 |
| 5,770,906 A | * | 6/1998 | Hazelton et al. | 384/107 X |
| 5,988,886 A | * | 11/1999 | Takahashi | 384/107 |
| 6,126,320 A | * | 10/2000 | Ichiyama | 384/112 |
| 6,246,136 B1 | * | 6/2001 | Ichiyama | 384/107 X |
| 6,264,368 B1 | * | 7/2001 | Tanaka et al. | 384/112 |

FOREIGN PATENT DOCUMENTS

JP 9229053 9/1997

* cited by examiner

Primary Examiner—Thomas R. Hannon
(74) Attorney, Agent, or Firm—Jordan and Hamburg LLP

(57) ABSTRACT

A dynamic pressure bearing which can eliminate an unbalanced existence of a lubricant fluid without increasing the diameter of a flange is compact in size and requires a lower rotation torque.

The dynamic pressure bearing, axial through holes 21 and 22 of a flange 2 are formed so as to be adjacent to a smaller diameter portion 1B of a shaft 1, and to be opposed to an end face 1A-1 of a larger diameter portion 1A. Thus, the axial through holes 21 and 22 do not reduce the area for forming a bearing surface of the flange 2, so that the unbalanced existence of a lubricant fluid can be eliminated by the axial through holes 21 and 22 without degrading the thrust supporting ability. The diameter of the flange can be reduced, and a stable supporting ability can be attained, and a compact size and a low rotation torque can be realized.

1 Claim, 2 Drawing Sheets

DYNAMIC PRESSURE BEARING

BACKGROUND OF THE INVENTION

The invention relates to a dynamic pressure bearing which performs supporting in the axial direction by means of a flange formed on a shaft.

FIG. 4 shows such a type of dynamic pressure bearing of the conventional art. In the dynamic pressure bearing, dynamic pressure generating grooves 103 and 105 for thrust supporting are formed in both axial end portions of a flange 102 formed on an end of a shaft 101. The flange 102 has through holes 107 and 109 which are adjacent to a portion 106 where the flange is joined to the shaft 101, and which are formed, so as to pass through the flange in the axial direction. Dynamic pressure generating grooves 111 and 112 for radial supporting are formed in the shaft 101.

The shaft 101 and the flange 102 are accommodated in a housing 115 which is configured by a cylinder 108 and a lid 110. The dynamic pressure generating grooves 103 and 105 formed in the flange 102 are opposed to a bearing surface 110A of the lid 110 and a bearing surface 108A of the cylinder 108 with forming a predetermined space therebetween, respectively.

In the dynamic pressure bearing, in the case where a lubricant fluid unbalancedly exists on an upper side or a lower side of the flange 102 during the rotation, the lubricant fluid is caused to flow from the upper side to the lower side or from the lower side to the upper side of the flange 102 through the through holes 107 and 109, so as to eliminate the vertically unbalanced condition of the flange 102.

However, the dynamic pressure bearing of the conventional art involves the following problems. The through holes 107 and 109 formed in the flange 102 reduces an area for forming the dynamic pressure generating grooves 103 and 105. In order to generate a predetermined dynamic pressure, therefore, it is necessary to increase the diameter of the flange. Thus, the outer diameter is disadvantageously increased, and a high torque is required for rotating the shaft.

SUMMARY OF THE INVENTION

Therefore, it is an object of the invention to provide a dynamic pressure bearing which can eliminate an unbalanced existence of a lubricant fluid without increasing the diameter of a flange, and which is compact in size and requires a lower rotation torque.

In order to attain the object, the dynamic pressure bearing of the invention of claim 1 is a dynamic pressure bearing having dynamic pressure generating grooves which are formed in an axial end face of a flange formed on a shaft or in a bearing surface opposed to the end face, and characterized in that the shaft includes: a smaller diameter portion which extends in an axial direction from the axial end face of the flange by a predetermined dimension; and a larger diameter portion which extends in the axial direction from the smaller diameter portion, and a through hole which passes through the flange in the axial direction is formed, the through hole being adjacent to the smaller diameter portion of the shaft, at least a part of the through hole being opposed to an end face of the larger diameter portion.

In the dynamic pressure bearing according the invention, the axial through hole of the flange is formed so as to be adjacent to the smaller diameter portion of the shaft, and opposed to the end face of the larger diameter portion. That: is, the axial through hole is formed in a region which is further in than the bearing surface of the flange, and hence the axial through hole does not reduce the area of the bearing surface of the flange. According to the invention, therefore, the unbalanced existence of a lubricant fluid can be eliminated by the axial through hole without increasing the diameter of the flange. Accordingly, a stable supporting ability can be exerted, and a compact size and a low rotation torque can be realized.

DETAILED DESCRIPTION OF THE PREFERRED EMBODIMENTS

Hereinafter, the invention will be described in detail with reference by means of illustrated embodiments.

[First Embodiment]

Figure 1:
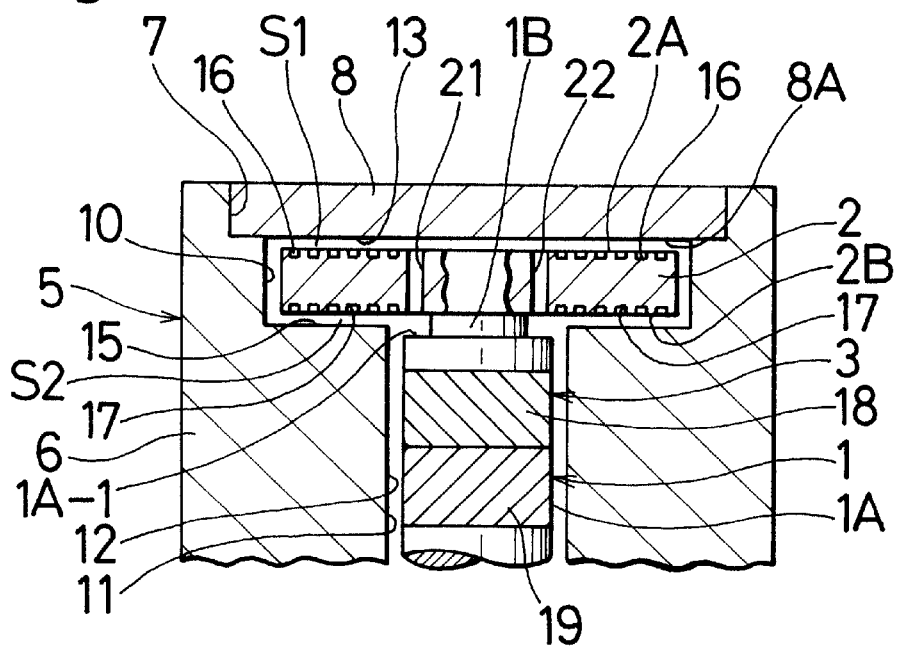
FIG. 1 is a section view of a first embodiment of the dynamic pressure bearing of the invention.

FIG. 1 shows a first embodiment of the dynamic pressure bearing of the invention. The dynamic pressure bearing comprises: a rotation member 3 which is configured by a shaft 1 and a flange 2 integrally formed on an axial end of the shaft: 1; and a housing 5 in which the rotation member 3 is accommodated. The housing 5 is configured by a cylindrical member 6, and a lid 8 which covers an opening 7 of an axial end o:E the cylindrical member 6. The cylindrical member 6 has a larger diameter hole 10 which is adjacent to the opening 7, and a smaller diameter hole 11 which is adjacent to the larger diameter hole 10. An inner circumferential face of the cylindrical member 6 which forms the smaller diameter hole 11 functions as a radial bearing surface 12. An inner face of the lid 8 functions as a thrust bearing surface 13. A step face between the larger diameter hole 10 and the smaller diameter hole 11 functions as another thrust bearing surface 15.

On the other hand, dynamic pressure generating grooves 16 and 17 for thrust supporting are formed in both end faces 2A and 2B of the flange 2 of the rotation member 3. The dynamic pressure generating grooves 16 and 17 for thrust supporting are opposed to the thrust bearing surfaces 13 and 15 forming a given space therebetween, respectively. In an outer circumferential face of a larger diameter portion 1A of the shaft 1, dynamic pressure generating grooves 18 and 19 for radial support are formed. A smaller diameter portion 1B which is continuous to the larger diameter portion 1A is formed so as to be continuous to the flange 2. The smaller diameter portion 1B of the shaft 1 is formed integrally with the flange 2.

Axial through holes 21 and 22 are formed in the flange 2 so as to be adjacent to the smaller diameter portion 1B of the shaft 1, and to be opposed to an end face 1A-1 of the larger diameter portion 1A. Specifically, the axial through holes 21 and 22 are formed in an area which is radially further in than the thrust bearing surface where the dynamic pressure generating grooves 16 and 17 for thrust supporting are formed.

In the dynamic pressure bearing having the above-mentioned configuration, when the rotation member 3 is relatively rotated with respect to the housing 5, the dynamic pressure generating grooves 18 and 19 for radial support formed in the larger diameter portion 1A of the shaft 1 generate a dynamic pressure between the shaft and an inner circumferential face of the cylindrical member 6, so as to support the rotation member 3 in a radial direction with respect to the housing 5. At the same time, the dynamic pressure generating grooves 16 and 17 for thrust support formed in the end faces 2A and 2B of the flange 2 generate a dynamic pressure between the flange and the lid 8 and the step face 15, so as to support the rotation member 3 in the axial direction with respect to the housing 5.

In the first embodiment, by the provision of the axial through holes 21 and 22 formed in the flange 2 of the rotation member 3, flow passages for a lubricant fluid are formed between a upper space S1 and a lower space S2 which are respectively above and below the flange 2. By the flow passages, unbalanced distribution of the lubricant fluid to the upper space S1 or the lower space S2 can be immediately eliminated, and the flange 2 can be maintained in a predetermined position in the larger diameter hole 10 of the housing 5, so that the rotation member 3 can be stably and surely supported.

In the first embodiment, moreover, the axial through holes 21 and 22 of the flange 2 are formed so as to be adjacent to the smaller diameter portion 1B of the shaft 1, and to be opposed to the end face 1A-1 of the larger diameter portion 1A. In other words, the axial through holes 21 and 22 are formed in an area which is radially further in than the bearing surface region opposed to the step face 15 of the cylindrical member 6. Therefore, the axial through holes 21 and 22 do not reduce the area of the bearing surface of the flange 2.

That is, according to the first embodiment, the axial through holes 21 and 22 can be positioned within the same diameter as that of the larger diameter portion 1A of the shaft 1, so that the whole areas of the end faces 2A and 2B of the flange 2 which are formed on the radially outer side with respect to the larger diameter portion 1A can function as a thrust bearing surface. In the embodiment, therefore, the axial through holes 21 and 22 can be disposed without degrading the thrust supporting ability, so as to eliminate the unbalanced existence of a lubricant fluid. Consequently, the diameter of the flange can be reduced, the compact size and the low rotation torque can be attained, and a stable supporting ability can be exerted.

Figure 2:
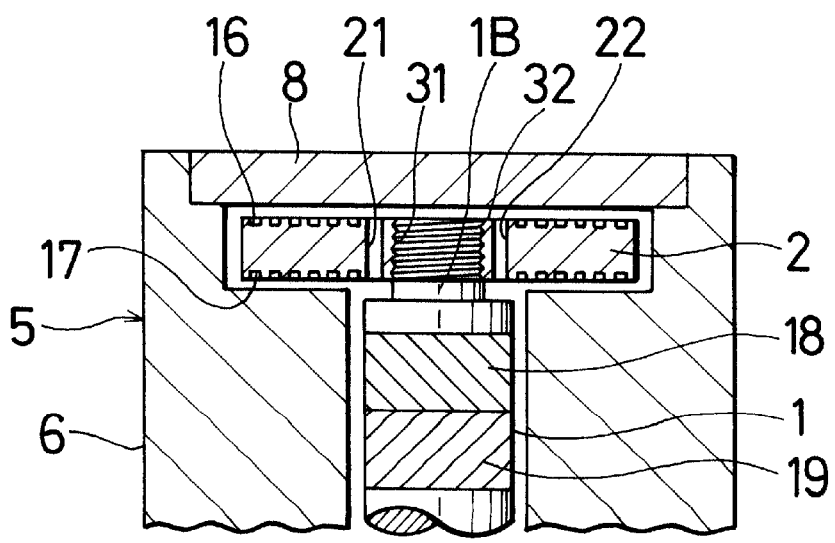
FIG. 2 is a section view of a modification of the first embodiment of the invention.

In the first embodiment, the shaft 1 and the flange 2 of the rotation member 3 are integrally formed. Alternatively, as shown in FIG. 2, the flange 2 and the shaft 1 may be separately formed. In this case, for example, a screw hole 31 is formed in the center of the flange 2, and a threaded portion 32 is formed so as to elongate on the smaller diameter portion 1B of the shaft 1. The threaded portion 32 of the shaft 1 is screwingly attached to the screw hole 31 of the flange 2.

[Second Embodiment]

Figure 3:
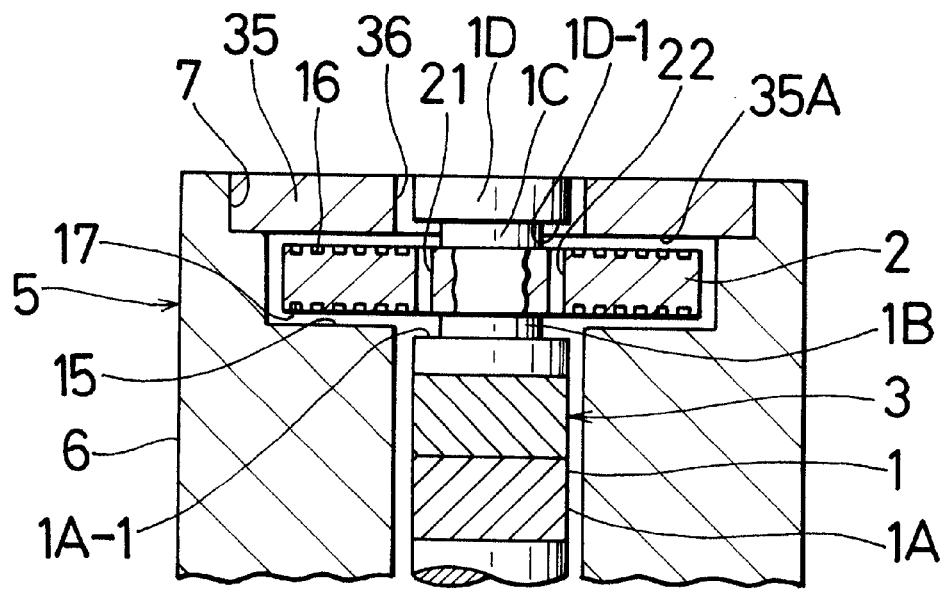
FIG. 3 is a section view of a second embodiment of the invention.
Figure 4:
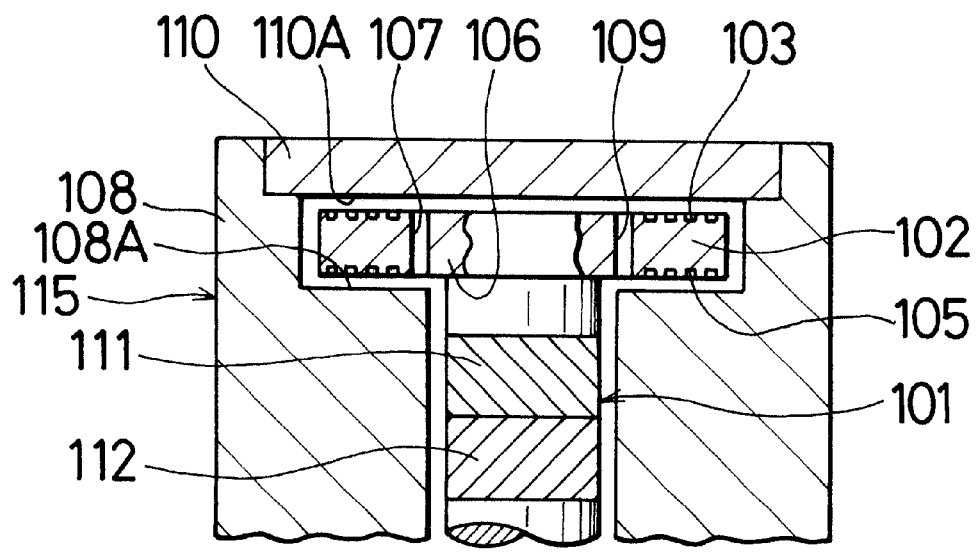
FIG. 4 is a section view of a dynamic pressure bearing of the conventional art.

FIG. 3 shows a second embodiment. The second embodiment is different from the above-mentioned first embodiment only in the following points (1) and (2).

(1) Instead of the lid 8 shown in FIG. 1, a disk 35 having a hole 36 at the center is fitted into and fixed to the opening 7 of the cylindrical member 6.

(2) The shaft 1 of the rotation member 3 comprises: another smaller diameter portion 1C which protrudes in the axial direction from the end face 2A of the flange 2; and another larger diameter portion 1D which is continuous to the smaller diameter portion 1C.

In the second embodiment, the larger diameter portion 1D of the rotation member 3 is disposed in the hole 36 of the disk 35 of the housing 5. Unlike the first embodiment which is a sealed dynamic pressure bearing, the second embodiment is an open dynamic pressure bearing in which the lubricant fluid in the housing 5 is exposed to the outside.

Also in the second embodiment, the axial through holes 21 and 22 of the flange 2 are formed so as to be adjacent to the smaller diameter portions 1B and 1C of the shaft 1, and to be opposed to the end face 1A-1 of the larger diameter portion 1A and an end face 1D-1 of the larger diameter portion 1D. That is, the axial through holes 21 and 22 are formed in an area which is radially further in than the bearing surface region opposed to the step face 15 of the cylindrical member 6 (and the disk-like plate 35), and hence the axial through holes 21 and 22 do not reduce the area of the bearing surface of the flange 2.

According to the second embodiment, the axial through holes 21 and 22 can be positioned within the same diameter as that of the larger diameter portions 1A and 1D of the shaft 1, so that the whole areas of the end faces 2A and 2B of the flange 2 which are formed on the radially outer side with respect to the larger diameter portions 1A and 1D can function as the thrust bearing surface. Therefore, according to the second embodiment, the axial through holes 21 and 22 are disposed without degrading the thrust supporting ability, so that: the unbalanced existence of a lubricant fluid can be eliminated. In the same manner as the first embodiment, the diameter of the flange can be reduced, and the compact size and the low torque can be attained. In addition, a stable supporting ability can be exerted. In the first and second embodiments, the axial through holes 21 and 22 are formed so that the whole part of the holes is in the area which is radially further in than the larger diameter portions 1A and 1D of the shaft 1. The invention is not limited to the embodiments. Although it is required that at least a part of the axial through holes 21 and 22 is opposed to the end faces 1A-1 and 1D-1 of the larger diameter portions 1A and 1D, it is preferable that the whole part of the holes is opposed to the end faces as in the first and second embodiments.

In the first and second embodiments, the dynamic pressure generating grooves 16 and 17 are formed in the both end faces 2A and 2B of the flange 2. Alternatively, dynamic pressure generating grooves may be formed in an inner face 8A of the lid 8 of the housing 5 (an inner face 35A of the disk 35), and the step face 15 of the cylindrical member 6.

As apparent from the above description, according to the dynamic pressure bearing of the invention, the axial through hole of the flange is formed so as to be adjacent to the smaller diameter portion of the shaft, and to be opposed to the end face of the larger diameter portion, and are formed in an area which is further in than the outer circumferential face of the larger diameter portion of the shaft, so that the axial through hole does not reduce the area of the bearing surface of the flange. According to the invention, therefore, the unbalanced existence of a lubricant fluid can be eliminated without increasing the diameter of the flange, by the axial through hole. Thus, the diameter of the flange can be reduced, the compact size and the low rotation torque can be attained, and a stable supporting ability can be exerted.

What is claimed is:

1. A dynamic pressure bearing having dynamic pressure generating grooves which are formed in an axial end face of a flange formed on a shaft or in a bearing surface opposed to the end face, wherein said shaft includes: a smaller diameter portion which extends in an axial direction from the axial end face of said flange by a predetermined dimension; and a larger diameter portion which extends in the axial direction from said smaller diameter portion, and a through hole which passes through said flange in the axial direction is formed, said through hole being adjacent to said smaller diameter portion of said shaft, at least a part of said through hole being opposed to an end face of said larger diameter portion.

\* \* \* \* \*